(12) United States Patent  (10) Patent No.: US 6,322,237 B1
Lee  (45) Date of Patent: Nov. 27, 2001

(54) LIGHTED WHEEL RIM SYSTEM

(76) Inventor: Dennis Ray Lee, 4053 Towne Crossing Blvd., #2706, Mesquite, TX (US) 75150

( * ) Notice: Subject to any disclaimer, the term of this patent is extended or adjusted under 35 U.S.C. 154(b) by 0 days.

(21) Appl. No.: 09/617,914

(22) Filed: Jul. 17, 2000

(51) Int. Cl.$^7$ .................................................. B60Q 1/00
(52) U.S. Cl. ........................ 362/500; 362/234; 362/249
(58) Field of Search .................................. 362/500, 234, 362/249

(56) References Cited

U.S. PATENT DOCUMENTS

| | | | |
|---|---|---|---|
| 4,430,692 | 2/1984 | Papadakis | 362/500 |
| 4,782,431 | 11/1988 | Park | 362/161 |
| 4,881,153 | 11/1989 | Scott | 362/500 |
| 4,893,877 | 1/1990 | Powell et al. | 362/35 |
| 5,016,144 | 5/1991 | DiMaggio | 362/35 |
| 5,040,100 | 8/1991 | Di Gaetano | 362/506 |
| 5,465,194 | 11/1995 | Currie | 362/464 |
| 5,530,630 | 6/1996 | Williams | 362/500 |
| 5,558,426 | 9/1996 | Cabanatan et al. | 362/500 |
| 5,800,035 | 9/1998 | Aichele | 362/31 |
| 6,168,301 * | 1/2001 | Martinez | 362/500 |

* cited by examiner

*Primary Examiner*—Alan Cariaso
*Assistant Examiner*—Hargobind S. Sawhney
(74) *Attorney, Agent, or Firm*—Richard C. Litman (57) ABSTRACT

A lighted wheel rim system is provided for illuminating the wheel of a vehicle by projecting visible light through decorative openings disposed within the rim of a tire. The lighted wheel rim system includes a plurality of individual lights or lamps, which, together, form an arrangement which is stimulating and aesthetically pleasing to the human eye. The lighted wheel rim system has two major parts, including a light housing assembly and a lighting assembly. Flange portions on the light housing assembly are configured for mounting to the brake rotor splash guards or brake shield of a vehicle. The flange portions are dimensioned to correspond to the outer curvature, shape, and size of the brake shield and to hold the light housing assembly in spaced apart relation therefrom. Each wheel of a vehicle is configured with a ring of individual lights as an integrated electrical system.

20 Claims, 6 Drawing Sheets

LIGHTED WHEEL RIM SYSTEM

BACKGROUND OF THE INVENTION

1. Field of the Invention

The present invention relates generally to automotive accessories. More specifically, the invention is an apparatus for illuminating the wheels of a vehicle.

2. Description of the Related Art

Numerous systems have been developed for providing improved visualization of the wheels of vehicles at night. Some of the most significant advances in the art have centered around the development of passive reflectors and parking lights. However, none of the references herein described provides a lighting apparatus which is adapted for mounting on the brake shield of a wheel. For example, U.S. Pat. No. 4,881,153, issued to Scott, discloses a lighting system for vehicle wheels and comprises a disk assembly which facilitates the electrical attachment of a rotating light with a stationary electrical power source of a vehicle. Further, the invention includes a mounting system for mounting a disk to the lugs of the vehicle on the inside of the wheel. The disk comprises first and second coaxially mounted electrically conductive rings which remain in continuous electrical contact when rotated relative to each other. The mounting system includes an electrically conductive portion and an insulator portion which electrically separates the mounting assembly from the first and second ring; the electrically conductive portion of the mounting means being used to electrically ground the rotating lights.

U.S. Pat. No. 4,782,431, issued to Park, relates to a lighting apparatus for mounting on vehicle wheels. The apparatus comprises a light unit fixed on a wheel member and a miniature magnetometer characterized by its rotor being coaxial with the wheel to produce power by rotation following the rotation of wheels.

U.S. Pat. No. 5,016,144, issued to DiMaggio, discusses an illuminating wheel cover comprising a momentary rotating mercury switch which gathers mercury during rotation and causes a momentary electrical connection to illuminate light emitting diodes arranged to create an illusionary effect.

U.S. Pat. No. 5,040,100, issued to Di Gaetano, presents a vehicle wheel well illumination device, comprising a pair of light sources and a resilient rod interconnecting the light sources in a spaced apart configuration. The resilient rod is capable of elastic deformation under a manual bending effort to bring the rod into a condition suitable to enter a wheel well of a vehicle. Discontinuance of the bending effort causes the rod to partially recover its original form, frictionally engaging the wheel well and causing it to be thereby retained in place.

U.S. Pat. No. 5,558,426, issued to Cabanatan et al., discloses a set of automotive wheel lights for illuminating the wheels of an automobile in operation at night, comprising a plurality of lights, one for each wheel, each mounted on the frame of the automobile near a-respective wheel. Each light includes a light bulb in a socket, held fixed at its lighting position at the lighting end of a rigid arm bent towards the wheel of the automobile and mounted onto and extending from the automobile; the light bulb is encased in a protective light bulb cover and lens in one which directs illumination onto the entire outside surface of the wheel. The light bulb in the socket is electrically connected to the power source of the automobile sharing a single switching control with the parking lights and headlights of the automobile.

U.S. Pat. No. 5,530,630, issued to Williams, Jr., relates to an apparatus for lighting a wheel rotatably mounted on a frame of a vehicle including a source of current mounted on the frame of the vehicle, a commutator mounted to the wheel for rotation therewith, at least one light bulb, and a brush electrically connected to the source of current and mounted to the frame adjacent the commutator. The brush has a contact portion for contacting the commutator to provide a flow of current from the battery to the commutator so as to power the light bulb. The apparatus is adaptable to cars, motorcycles, and semi-truck wheels, whether the wheels are mounted as singles or as duals.

U.S. Pat. No. 5,800,035, issued to Aichele, discloses a wheel lighting apparatus for use on a vehicle wheel rotatably mounted on a vehicle body. The wheel lighting apparatus includes a chamber mounted to the wheel with a portion of the chamber formed from material which permits the transmission of light therethrough. A light transmitting member is provided for transmitting light from the light source to outside the chamber. The light transmitting member also has a light conducting portion and a light emitting surface. The light received by the light receiving surface travels through the light conducting portion to the light emitting surface where the light is emitted in a predetermined pattern adjacent the wheel. An electrical connector device is provided to connect a power source mounted on the vehicle body to the light source. The electrical connector device includes a pair of circular rings of electrically conductive material mounted to the wheel and electrically insulated therefrom. The electrical connector device also includes a pair of contactors mounted to the body, each having an electrically conductive, movable contact portion in electrical contact with their respective circular rings. A pair of electrical conductors are provided for electrically connecting the terminals of the power source to the light source through the flexible contact portion of flexible connectors and their respective rings.

U.S. Pat. No. 4,893,877, issued to Powell et al., discusses a lighted hubcap including a cap body that has an outboard side and an opposing inboard side. When the cap body is secured to the wheel of a passenger vehicle, the outboard side faces away from the vehicle. At least one light emitter is incorporated in the cap body so that it emits light from the outboard side of the cap body when energized. A permanent magnet assembly is pivotally secured to the cap body and weighted so that the permanent magnet assembly is in a generally fixed orientation with respect to the passenger vehicle. Electrically conducting windings are secured to the inboard side concentrically about the permanent magnet assembly and are connected to the light emitters. The windings are in magnetic flux coupling relationship with the permanent magnet assembly so that, upon rotation of the wheel, alternating current is generated in the winding for energizing the light emitters.

U.S. Pat. No. 5,465,194, issued to Currie, discusses an optical fiber illumination device, and, finally, U.S. Pat. No. 4,430,692, issued to Papadakis, discloses an automotive vehicle wheel illumination and light reflective system for an automotive vehicle having at least one rotatable wheel, comprising a light source mounted to the vehicle, light transmission means operatively associated with the light source, and reflective surface means for reflecting light to produce a visual light illumination effect.

None of the above inventions and patents, taken either singularly or in combination, is seen to describe the instant invention as claimed. Thus, a lighted wheel rim system solving the aforementioned problems is desired.

SUMMARY OF THE INVENTION

The lighted wheel rim system according to the invention comprises a means for illuminating the wheel of a vehicle by projecting visible light, preferably through the decorative openings incorporated into the rim of a tire. The present invention provides a significant improvement in that it remains essentially stationary with respect to the wheel and is protected by the body of the wheel from damaging exterior forces. An additional advantage is that the invention comprises no moving parts, an important feature further insuring its stability and durability. The lighted wheel rim system may be installed by the manufacturer in the factory or retrofitted and is preferably mounted on the wheel and inboard of the brake rotor of the vehicle. The lighted wheel rim system comprises a plurality of individual is lights or lamps, which, together, form an arrangement which is stimulating and aesthetically pleasing to the human eye.

The lighted wheel rim system comprises two major parts, including a light housing assembly and a lighting assembly. The lighting assembly comprises a plurality of lamps or light units preferably connected in parallel so that if one lighting element burns out the others remain unaffected. Flange portions on the light housing assembly are configured for mounting the invention to the brake rotor splash guards or brake shield of a vehicle. The flange portions are dimensioned to correspond to the outer curvature, shape, and size of the brake shield and to hold the light housing assembly in spaced apart relation therefrom. The light housing assembly further comprises a circular body having a hollow cross section defining an interior passageway inside of which the electrical conductive means of the lighting assembly are contained, the circular body having a series of spaced apart apertures disposed along the length thereof, each light socket or light being frictionally retained within an aperture. The lighted wheel rim may further have a light cover for covering at least one of its lights. An electrical conductor is provided to electrically connect a power source to the lighted wheel rim system. An on/off switch is also provided to control the state of the electrical circuit in order to turn the lights on or off simultaneously.

Accordingly, it is a principal object of the invention to provide a lighted wheel rim system which creates an effective and aesthetically pleasing light display.

It is another object of the invention to is to provide a lighted wheel rim system adapted for fastening to the brake shield of a vehicle.

It is a further object of the invention to provide lighted wheel rim system which may be readily mounted and dismounted from vehicles.

Still another object of the invention is to provide a lighted wheel rim system, which may be rigidly mounted to a vehicle, is rigid enough to withstand external forces and vibrations, and is sturdy and durable.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is directed to a lighted wheel rim system for illuminating the wheel of a vehicle. The preferred embodiment of the invention is depicted in FIGS. 1–3, and 6, and is generally referenced by numeral 10.

Figure 1:
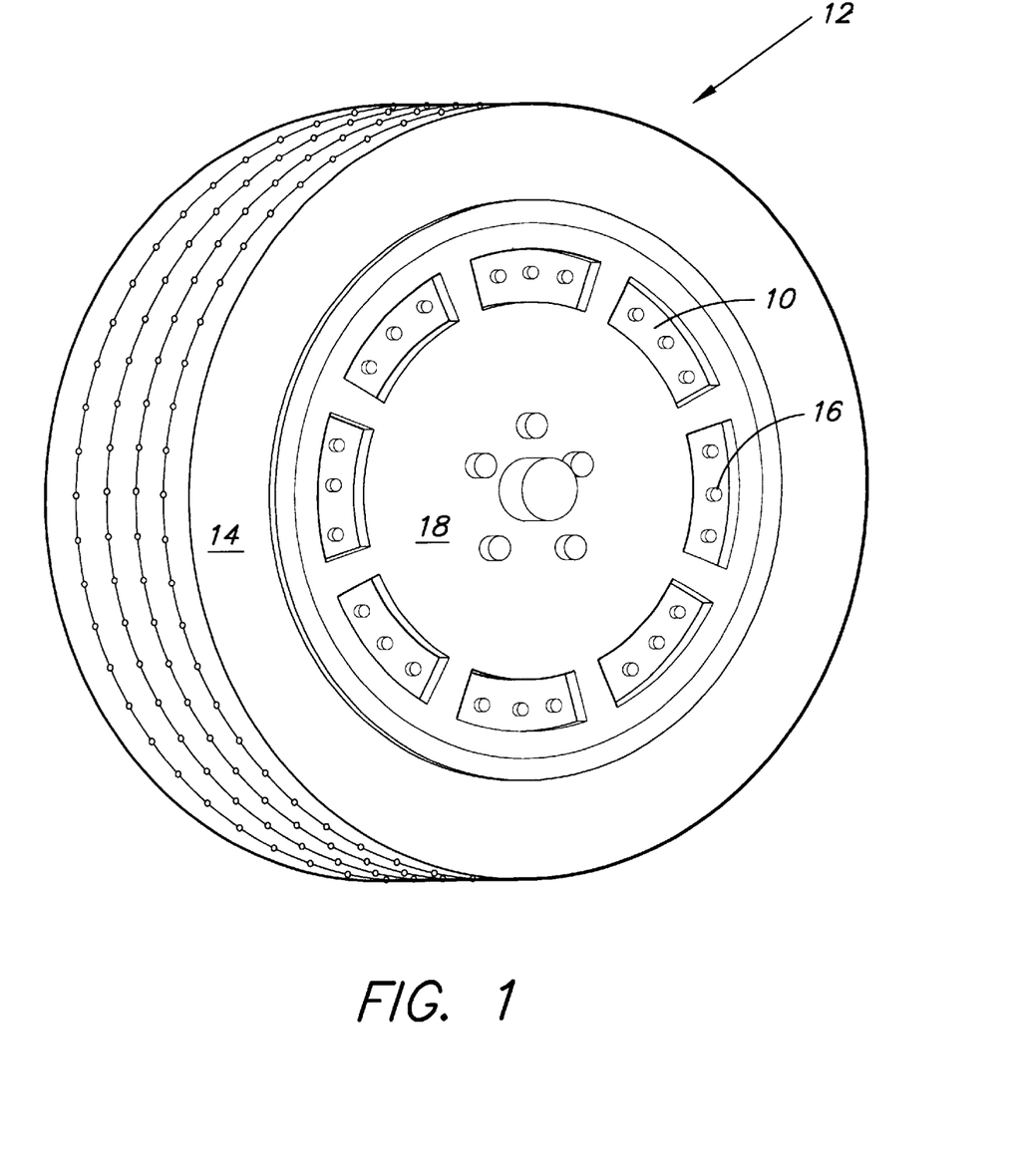
FIG. 1 is an environmental, perspective view of the lighted wheel rim system, according to the present invention.

As diagrammatically illustrated in FIG. 1, an environmental view is depicted in which the lighted wheel rim system 10 has been mounted or installed on the wheel 12 and inboard of the brake rotor of a vehicle. The invention comprises a plurality of individual lights or lamps 16, which, together, form an arrangement which is stimulating and aesthetically pleasing to the eye. The lighted wheel rim system 10 may be installed by the manufacturer in the factory or retrofitted; however, because the lighted wheel rim system 10 is designed to be attached to the brake shield of a vehicle, the invention may be sold in a variety of ways including as single units, or in kits, such as with a particular model tire rim or tire and tire rim assembly, or even as an accessory in a brake conversion kit. Alternatively, the lighted wheel rim may be mounted on the backing plate for drum brakes.

The importance of decorative accoutrements and embellishments for vehicles is becoming increasingly evident. From 1990 to 1996, the sale of automotive accessories and performance equipment increased by 45 percent to $18 billion. Many Americans commonly report that they spend more time in their cars and trucks than in their living rooms, and so believe that their vehicles should be appropriately personalized. One of the most popular forms of ornamentation is custom designed wheels, chrome wheels being a good example. Additionally, over the past few years, the popularity of the use of neon and other lighting elements has skyrocketed—from strobe lights and neon license plates to illuminated cargo areas and speakers, neon and similar automotive accessories have become a major fashion. D.O.T. studies have shown that side marker lamps on vehicles are associated with a significant decrease in the incidence of accidents. Thus, a significant market exists for a rugged, durable, and practical accessory for providing an aesthetically pleasing illumination effect for the wheels of a vehicle, as well as for helping to insure the safety of drivers.

In the preferred manner of use of the invention when mounted on a wheel 12, the area between the central portion 18 of the rim and the tire 14 will be provided with a plurality of substantially arcuate trapezoidal openings, generally 20 (see FIG. 2), through which the individual light units 16 of the lighted wheel rim system 10 may be visually distinguished by an observer, as seen in FIG. 1.

Figure 2:
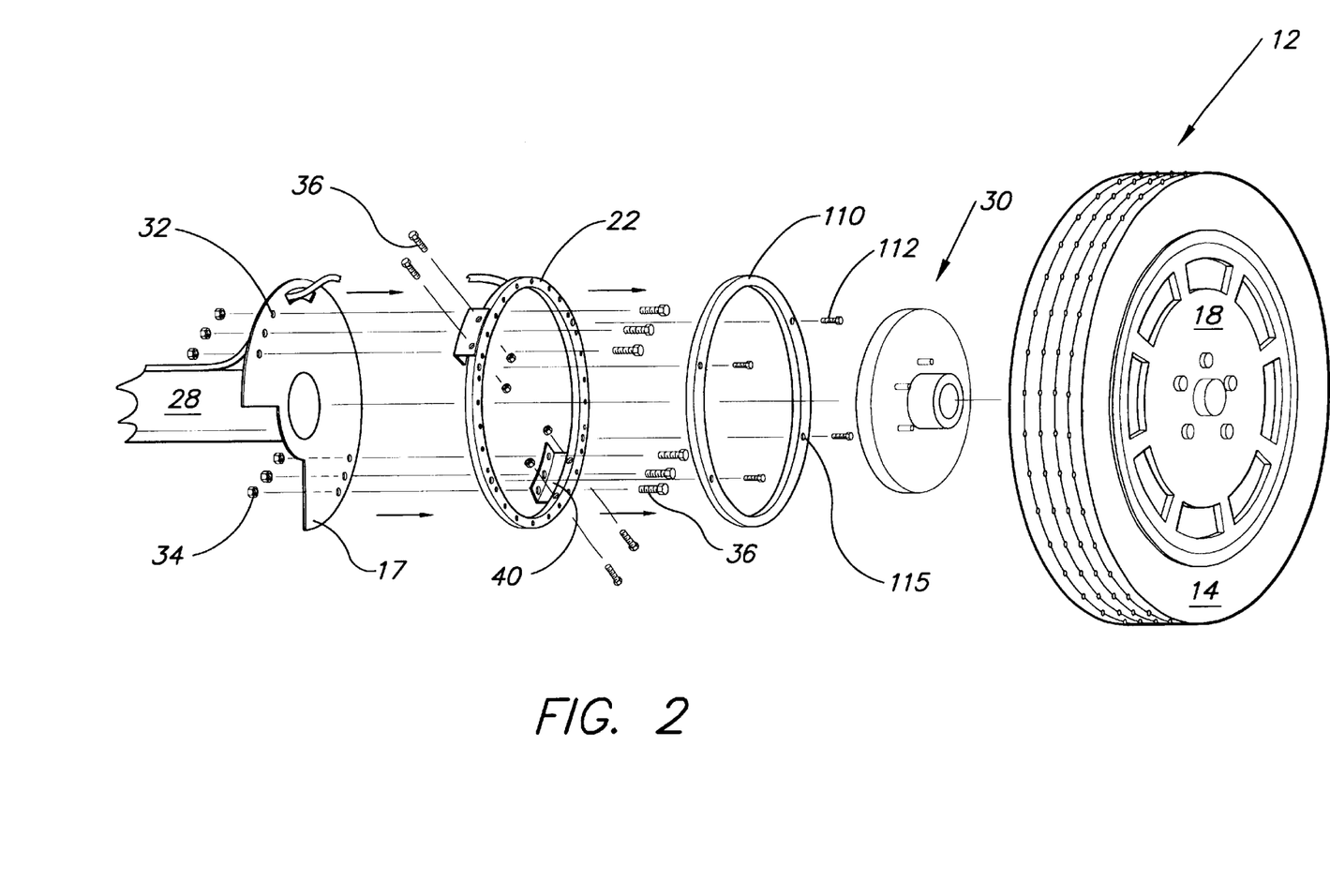
FIG. 2 is a perspective view of the lighted wheel rim system, showing the manner of attachment to a tire, according to the invention.

In certain kinds or models of wheels, these openings 20 may follow a specific decorative pattern or configuration. This specification encompasses patterns of the lighted units 16 corresponding to or matching with the various arrangements and designs of the openings 20 found in conventional tire rims, as well corresponding or parallel to the openings 20 defined by the plurality of spokes typically disposed axially outward from the central portions of conventional tire rims.

In short, the lighted wheel rim system 10 encompasses and is inclusive of any and all designs or patterns for the spatial configurations of the lights 16 for the visual stimulation of an onlooker. It should, therefore, be understood that a tire rim used concomitantly with the invention, as well as any covering for the lights 16, should comprise at least one means for transmitting light therethrough; the light transmitting means may be any structure or substance, including transparent materials, as well as structures having an opening or series or arrangements of openings, inclusive of openings having lenses, screens, and transparent elements disposed therein, openings containing light reflective and opaque elements, light conducting elements such as fiber optics, or any other device or apparatus for transmitting light generated by the lighted wheel rim system 10 or individual light units 16 thereof. The light transmitting means may also have a light emitting surface, the light received by the light transmitting means traveling therethrough to the light emitting surface where the light is emitted in a predetermined pattern adjacent the wheel.

The specification also embraces any kinds of illumination means, including conventional light bulbs, LEDs, vibration absorbing mini bulbs, and fiber optic elements, as well as electrical configurations for powering or supplying power to those illumination means. Furthermore, the lighted wheel rim system 10 may have lights which flash, blink, or flicker according to any pattern the user may desire, as well as the appropriate electronic means to execute such patterns. The present invention may also comprise safety lights to insure safe operation of the vehicle under low visibility conditions, helping vehicle drivers overcome their blind spots when driving.

The prior art demonstrates that various attempts have been made to illuminate the wheels of vehicles. These inventions are typically designed to be placed on rotatably mounted wheels and, thus, are subject to breakdown secondary to the destructive effects of vibration, rotation, and material degradation on the road. The present invention provides a significant improvement in that it remains stationary with respect to the wheel and is largely protected by the body of the wheel from damaging exterior forces. This advantage is further augmented by the fact that the invention comprises no moving parts, an important feature insuring its stability and durability, especially on bumpy terrain.

Figure 3:
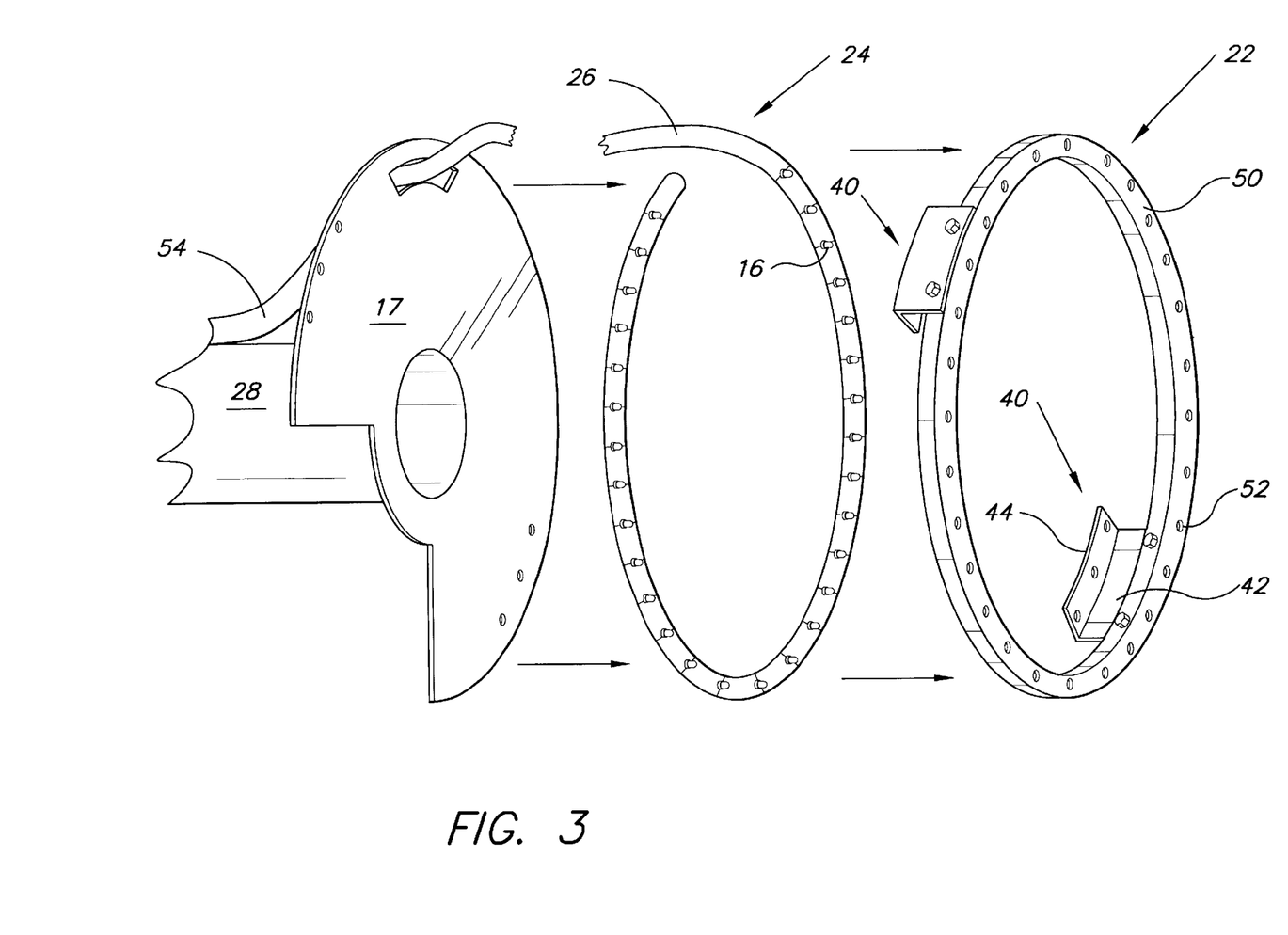
FIG. 3 is a perspective view of the lighted wheel rim system, showing the manner of attachment of the lighting circuitry assembly to the rim, according to the invention.

Turning briefly to FIG. 3, it can be seen that the two major parts of the lighted wheel rim system 10 are a light housing assembly 22 and a lighting assembly 24. The lighting assembly 24 comprises a plurality of light units 16 connected in parallel so that if one lighting element 16 burns out, the others remain unaffected. The lighting assembly 24 comprises flexible insulated wires which are easily wound into a circular-shaped band for positioning inside of the light housing assembly 22 so as to be insertable in the housing of the apparatus of the invention. In an alternative embodiment, the lighting assembly 24 may be removably attached to the light housing assembly 22. In various embodiments of the invention, a light unit 16 may be replaced by direct insertion into the light housing assembly 22 or after removal of the lighting assembly 24 therefrom.

Referring to FIG. 2, the light housing assembly 22 is specially designed for mounting to the brake rotor splash guards (disk brake guards) 17 or the backing plate for the drum brakes of a vehicle and may be suitably shaped, sized, and dimensioned to fit over any such brake shield 17 or backing plate commonly known in the art and commercially available. In an alternative embodiment of the invention, the lighted wheel rim system 10 may be integral with the brake shield 17. The light housing assembly 22 may further be comprised of any durable and suitably strong substance, including steel, polymeric material, and transparent material. Obviously, different types of wheels 12 including different constructions, configurations, and comprising different ent materials could be utilized.

In FIG. 2, the basic relationship of the lighted wheel rim system 10 to the various subcomponents of the brake assembly and tire 14 can be discerned more clearly. When mounted, it can be appreciated that the wheel light housing assembly 22 is fastened onto a brake shield 17 conventionally attached to an axle 28—the brake/rotor assembly, represented by 30, being mounted between the tire 14 and axle 28, also in the conventional manner. Another advantage of the invention is that it allows for easy attachment of the device to the wheel of a vehicle and should further help to protect the brakes from dirt and dust.

Turning again to FIG. 3, extending from the peripheral edge surface 38 of the light housing assembly 22 are removable flange portions 40 comprising spaced apart apertures for receiving the mounting bolts. The flange portions 40 are dimensioned to correspond to the outer curvature of the brake shield 17 and to hold the light housing assembly in spaced apart relation therefrom, the flange portions 40 each defining first 42 and second 44 plates. The first plate 42 of the flange portion 40 develops into and is normally disposed to the second plate 44. In the preferred embodiment of the invention, the apertures are disposed though the first 42 and second plate 44 of the flange portion 40.

Figure 4:
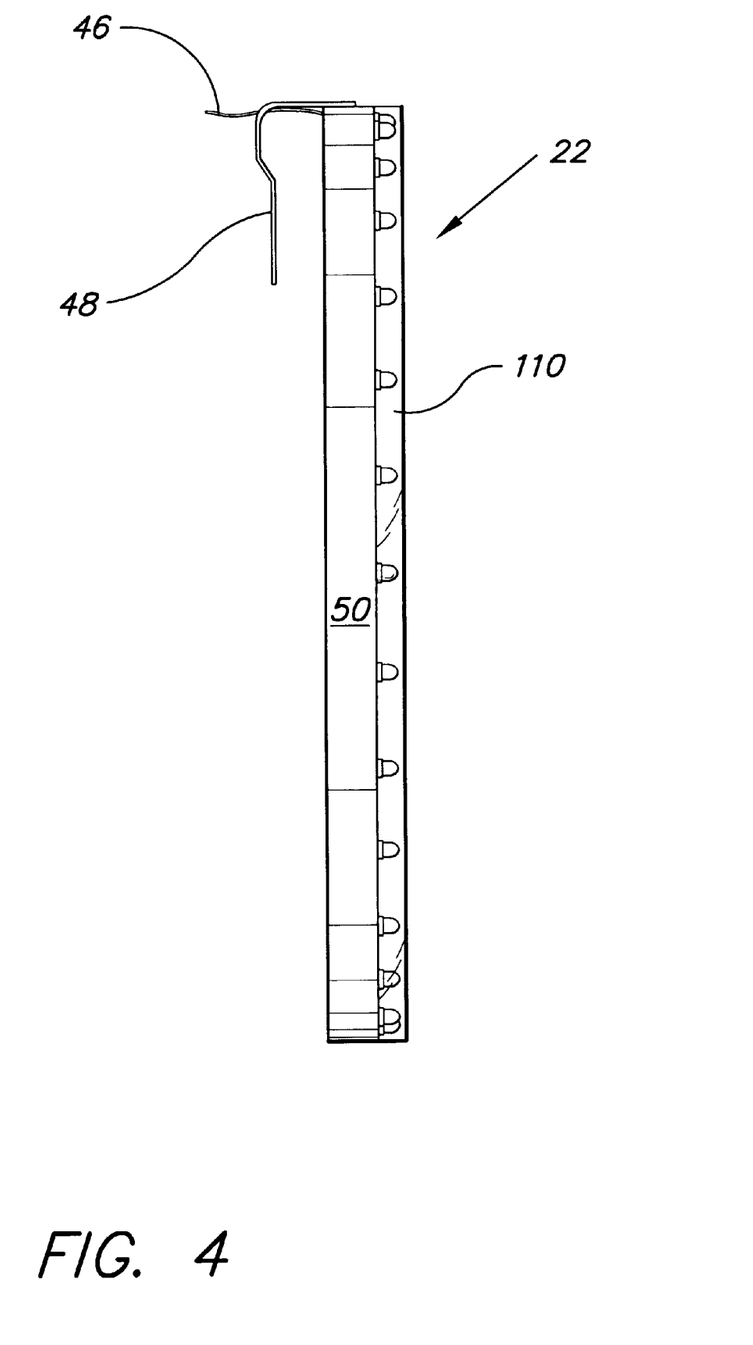
FIG. 4 is a side view of a second embodiment of the lighted wheel rim system, according to the invention.
Figure 5:
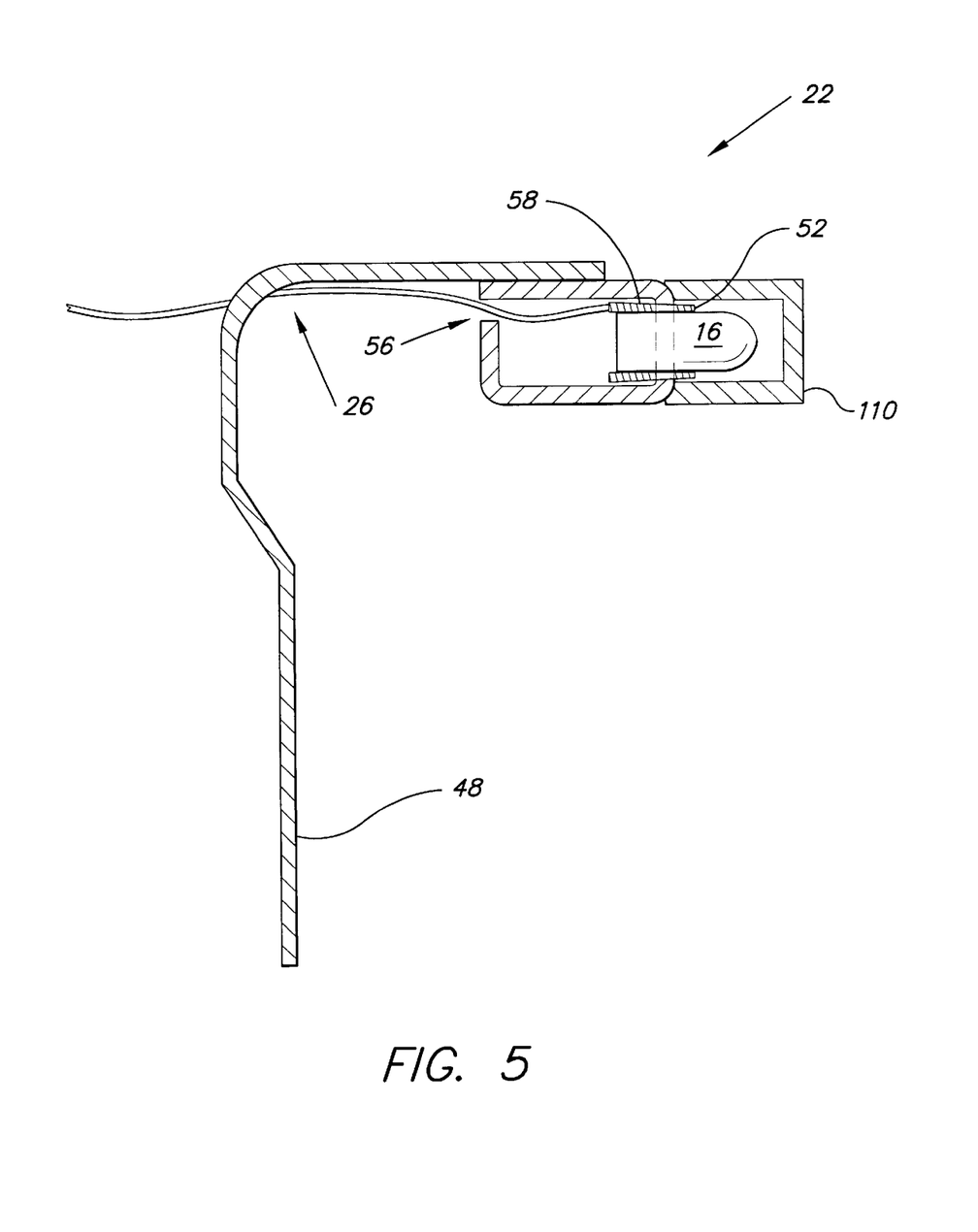
FIG. 5 is a perspective section view of a second embodiment the lighted wheel rim system, illustrating a single light attachment, according to invention.

It should be understood that this specification covers flange portions 40 of any shape, size, and dimension, for fastening to brake shields 17 of assorted models, such as the embodiment shown in FIGS. 4—5, where the flange portion 40 comprises a substantially arcuate section developing into a planar portion which defines an angle of approximately 45 degrees with respect to the plane defined by the light housing assembly 22, and finally developing into a straight segment 48 parallel to the plane defined by the light housing assembly 22, substantially as shown. Furthermore, these flange portions 40 or brackets are removable from the light housing assembly 22 and may be adjustable to more fully cooperate with the brake shields 17.

It should be understood that this specification embraces any fasteners by which the flange portions 40 may be removably attachable or integral with their respective support surfaces, especially those of the light housing assembly 22 and the brake shields 17, as well as any material components, structures, and assemblies allowing the flange portions 40 to accommodate to or be adjustably received by a brake shield 17 or backing plate or to be suitably adjusted with respect to the housing assembly 22. Also, any kind of brake shield 17 or backing plate may be used, including brake shields 17 with or without apertures for receiving therethrough a cord supplying power to the lights 16.

Turning specifically to FIG. 5, an enlarged, cross sectional view of the upper portion of the alternative embodiment of the invention presented in FIG. 4 and showing a single light 16 attachment as an example of a possible arrangement of the illuminating means and its accessory electronic components is seen. As best appreciated by comparing FIG. 5 to the side angle view of FIG. 3, it can also be seen that the circular body 50 of the light housing assembly 22 has a hollow cross section and defines an interior passageway. In the embodiment of the invention presented in FIG. 3, the circular body 50 also comprises a series of spaced-apart apertures, generally 52, disposed along the length thereof.

As seen in FIGS. 2, 4, and 5, the system 10 may further comprise a generally ring-like cover 110 for attaching to the circular body 50 of the light housing assembly, substantially as shown; the cover 110 may be frictionally attached, removably attached, screwedly attached, or fastened to the circular body 50 by bolts 112 insertably received through spaced apart apertures 115 disposed thereon. The cover 110 may be made of any suitably strong and durable material, including transparent and colored polymeric material.

As illustrated in FIG. 3, the light assembly 24 comprises a plurality of light elements 16 electrically interconnected by any means wherein the outer surface 25 of the lighting assembly 24 includes an outer nonconductive layer of material, the lights 16 spaced along the length thereof and electrically connected to a source of power. The light assembly 24 develops into a common cord, which preferably passes through an aperture disposed through the brake shield 17. It should be emphasized again that the invention may comprise any arrangement for supplying power to the lighted wheel rim system 10.

Turning again to FIG. 5, in this alternative embodiment it may be appreciated how the individual bulbs 16 may be installed in the apertures 52 by inserting the lighting assembly 24 through the passageway of the circular body 50 with each light socket or individual light 16 pushed or pulled through the apertures 52 and frictionally retained therein. The light bulbs 16 typically have a threaded end which is passed through the aperture 52 in the circular body, which may, along with any metallic portion of the vehicle, act as a grounding plate. At least one exit opening 56 for the wires 26 may also be provided, according to the manufacturer's requirements. A nut or socket 58 mates with the threaded portion and secures the light bulb 16 to the circular body 50. The lead wire 26 may extend from the light bulb 16, connecting the light bulb 16 to the central cord 54 or lighting assembly 24, which connects to a central power source. It should be emphasized that the specification encompasses any means for mounting such lights to the apparatus of the invention, whether the lights are screwedly mounted or merely inserted into a receiving structure in the housing 22 adapted for providing power to them.

Figure 6:
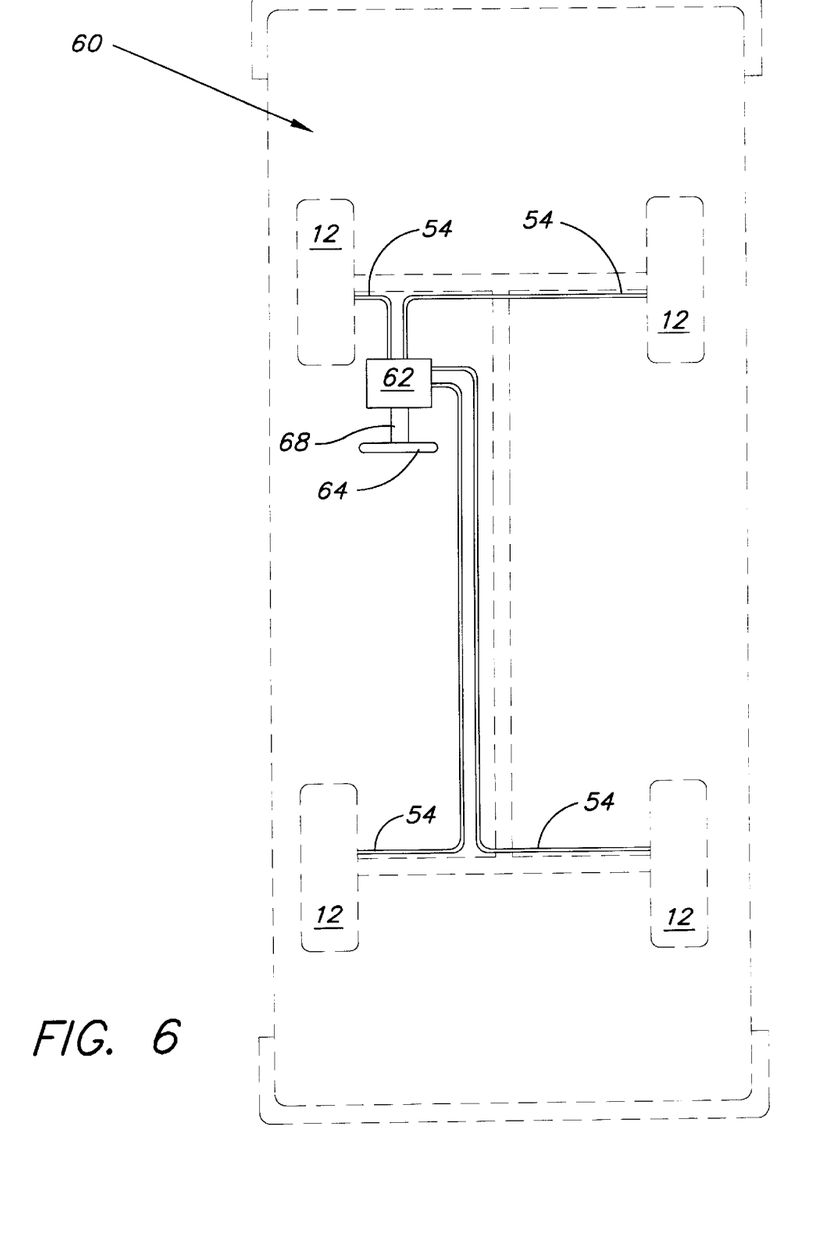
FIG. 6 is a diagrammatic view of the electrical system of the lighted wheel rim system, according to the invention.

Lastly, FIG. 6 illustrates a preferred embodiment of the electrical circuitry 60 of the present invention. A source of electrical current 62, including but not limited to a conventional vehicle battery, a generator, or the like, is mounted so as to be stationary with respect to the frame of the vehicle. The battery 62 supplies current when activated by a central switch 64, and a lead line 68 extends from the switch 64 to the battery 62. Thus, a plurality or set of lighted wheel rim systems 10 in a particular vehicle may be interconnected into a single electrical network, powered by single energy source; alternatively, each individual set of lights in a particular lighted wheel rim system 10 may have its own independent power source. The on/off switch 64 is preferably provided to control the state of the electrical circuit 60 in order to turn on or off the lights simultaneously.

It is to be understood that the present invention is not limited to the embodiments described above, but encompasses any and all embodiments within the scope of the following claims.

I claim:

1. A lighting apparatus for mounting on the brake shield of a vehicle comprising:
    (a) a lighting assembly and at least one power source, said lighting assembly including at least one light unit and a respective electrical conductor for supplying electrical power from said power source to said at least one light unit; and,
    (b) a light housing assembly, said light housing assembly comprising a housing body, said housing body being removably fastened to a brake shield of a vehicle.

2. The lighting apparatus of claim 1, wherein said housing body is hollow and adapted for containing said electrical conductor therein.

3. The lighting apparatus of claim 1, wherein said electrical conductor comprises at least one wire.

4. The lighting apparatus of claim 1, wherein said housing body comprises at least one aperture for frictionally supporting said at least one light unit within said aperture.

5. The lighting apparatus of claim 1, wherein said lighting assembly is removably fastened to said light housing assembly.

6. The lighting apparatus of claim 1, wherein said housing body comprises at least one flange portion dimensioned for mounting to said brake shield;
    said apparatus further comprising at least one fastener for connecting said flange portion to said brake shield.

7. The lighting apparatus of claim 1, wherein said apparatus further comprises a tire rim defining apertures to allow an observer to see said at least one light through said apertures when said tire rim and said lighting apparatus are mounted to a wheel of a vehicle.

8. The lighting apparatus of claim 1, wherein said apparatus further comprises a brake shield;
    said apparatus further comprising a light cover for covering said at least one light unit.

9. The lighting apparatus of claim 8, wherein said brake shield comprises an aperture for receiving said electrical conductor therethrough.

10. A lighting apparatus for mounting on the brake shield of a vehicle comprising:
    a substantially circular housing and at least one power source, said housing defining an interior passageway for containing a cord of at least one light of a light assembly, said cord for supplying electrical power to said at least one light from said power source;
    said housing having at least one flange portion for mounting said housing to the brake shield of a wheel;
    said apparatus further comprising at least one fastener for connecting said flange portion to said brake shield.

11. The lighting apparatus of claim 10, wherein said housing comprises at least one aperture for receiving said at least one light of said light assembly and for frictionally supporting said at least one light within said aperture.

12. The lighting apparatus of claim 11, wherein said apparatus further comprises at least one switch for electrically activating said apparatus when connected to a power source;

said apparatus further comprising a light cover for covering said at least one light.

13. The lighting apparatus of claim 12, wherein said apparatus further comprises a brake shield, said lighting apparatus being adapted to be mounted to said brake shield.

14. The lighting apparatus of claim 13, wherein said brake shield comprises an aperture for receiving said cord therethrough.

15. The lighting apparatus of claim 14, wherein said apparatus further comprises a tire rim defining an aperture.

16. The lighting apparatus of claim 15, wherein said tire rim comprises means for transmitting light.

17. A lighting apparatus for automobiles comprising in combination with at least one tire and rim assembly:
   (a) a lighting assembly and at least one power source, said lighting assembly including at least one set of light units and at least one electrical conductor circuit for supplying electrical power to said at least one set of light units from said power source; and,
   (b) a light housing assembly, said light housing assembly comprising a housing body, said housing body being removably fastened to a brake shield of a vehicle;
   said housing body being hollow and adapted for containing said electrical conductor circuit therein;
   said lighting assembly being fastened to said light housing assembly;
   said housing body including at least one aperture for frictionally supporting said at least one light unit within said aperture;
   said apparatus further comprising at least one fastener for connecting said housing body to said brake shield.

18. The lighting apparatus of claim 17, wherein said apparatus further comprises a tire rim defining apertures to allow an observer to see said at least one light through said apertures when said tire rim and said lighting apparatus are mounted to a wheel of a vehicle.

19. The lighting apparatus of claim 18, wherein said apparatus further comprises a brake shield;
   said brake shield comprising an aperture for receiving said electrical conductor therethrough.

20. The lighting apparatus of claim 17, further comprising a means for switching on said at least one set of lights, said at least one set of lights being interconnected by a single circuit, said at least one set of lights being interconnected in parallel.

* * * * *